United States Patent [19]

Miller

[11] Patent Number: 4,865,171

[45] Date of Patent: Sep. 12, 1989

[54] BRAKE BLEEDER VALVE

[76] Inventor: Ronald J. Miller, 15227 S. Kilpatrick, Oak Forest, Ill. 60452

[21] Appl. No.: 212,615

[22] Filed: Jun. 28, 1988

[51] Int. Cl.⁴ .............................................. B60T 11/30
[52] U.S. Cl. ..................................... 188/352; 137/846
[58] Field of Search ............... 137/846, 852, 853, 855; 188/352; 60/584

[56] References Cited

U.S. PATENT DOCUMENTS

| 2,219,604 | 10/1940 | Trotter | 137/846 X |
| 4,149,560 | 4/1979 | Berg | 188/352 X |
| 4,484,671 | 11/1984 | Carré et al. | 188/352 |
| 4,524,805 | 6/1985 | Hoffman | 137/846 |

FOREIGN PATENT DOCUMENTS 1075702 4/1954 France .................................. 188/352
536570 5/1941 United Kingdom ................ 188/352

Primary Examiner—Duane A. Reger
Attorney, Agent, or Firm—Juettner Pyle Lloyd & Verbeck

[57] ABSTRACT

A brake bleeder valve which is adapted to be temporairily and releasably connected to a standard brake bleeder screw and/or to a threaded outlet opening in a master cylinder for quickly bleeding a wheel cylinder or caliper and/or the master cylinder is disclosed. The bleeder valve may be molded in one piece body of a flexible or resilient material, such as rubber or the like, and may utilize a duckbill type one-way valve formed therein to permit the flow of air and fluid from the item being bled, but prevent the return of any air. The bleeder valve is particularly useful in bleeding automotive, aircraft or other brake systems.

16 Claims, 1 Drawing Sheet

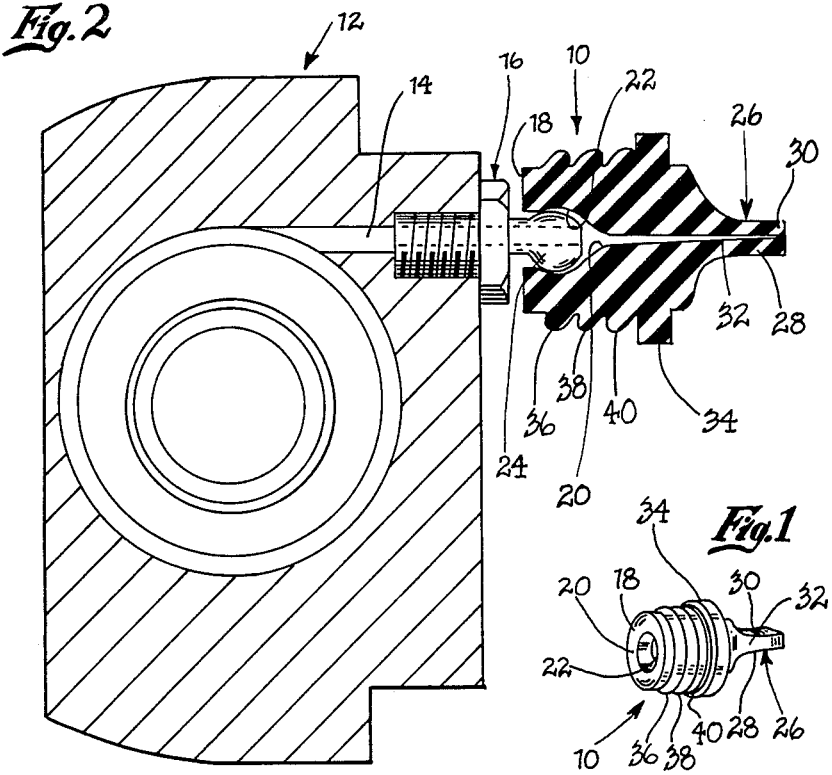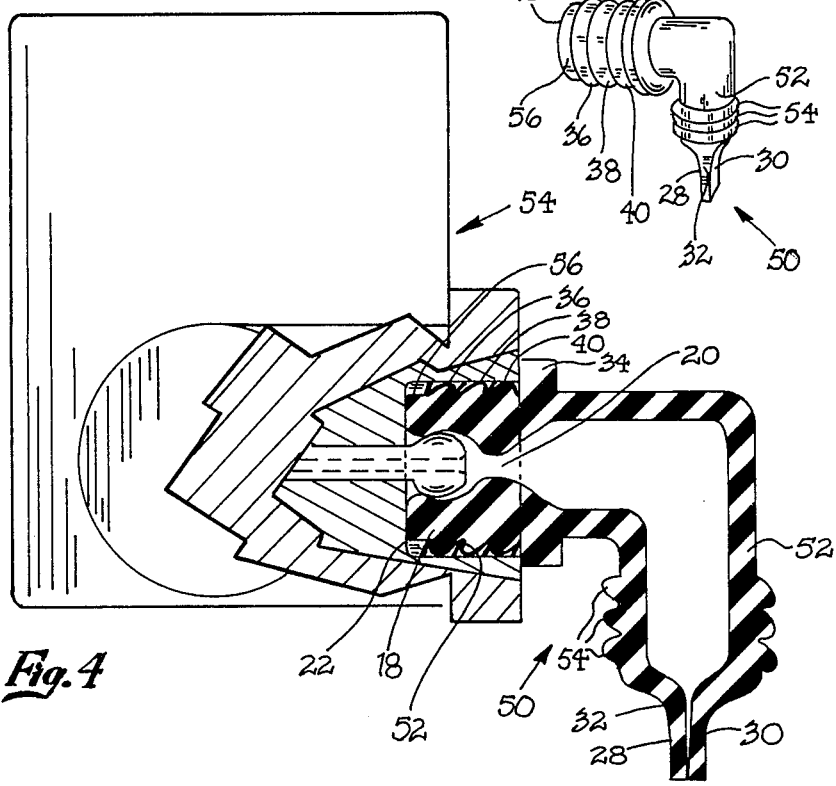

BRAKE BLEEDER VALVE present invention relates to a valve for bleeding gas or air from hydraulic systems, such as for brakes, and more particularly to a valve for bleeding a wheel cylinder or caliper and/or a master cylinder in such brake systems.

BRIEF DESCRIPTION OF THE PRIOR ART

It has long been known that one can use a one-way bleed valve to simultaneously bleed one, two or all four brake cylinders of a vehicle. In the past, many attempts have been made to incorporate a one-way valve into the bleeder screw of a hydraulic brake wheel cylinder or caliper. For example, see U.S. Pat. Nos. 2,771,093; 2,892,614; 3,050,080; 3,913,619 and 4,149,560. While these prior art devices may have been operable, they have had the disadvantage of a multi-part construction generally using some type separate, movable member, be it a ball or valve spindle, to close an opening or passage. As these devices were generally to be left on the automobile, there was always a possibility that such device might leak or fail, resulting in a loss of brake fluid, possible brake failure, an accident and tremendous potential liability. Various attempts have been made to try to minimize the effects of vibrations and inadvertent openings of such devices. However, in today's suit conscious society, the potential liability attached to such a product makes it a very unattractive product to produce or market.

Other prior art bleeder valves which are more in the nature of a mechanic's tool have been developed, and are designed to be temporarily attached to the standard brake bleeder screw found on automobiles, trucks, aircraft, and in other brake and hydraulic systems. For example, see U.S. Pat. Nos. 4,149,560 and 4,479,511. However, these tools which are temporarily attached to the bleeder screw during a bleeding operation, again, have the multi-part disadvantage, generally having three or more parts, one part being a housing having a passage, the second being the movable member for closing the passage, and the third being a spring to bias the movable member closed. Due to the multiplicity of parts, the tool was expensive to manufacture, and consequently not widely used by automobile mechanics, and particularly the home mechanic, who may, himself, repair the brakes on his car once, while he owns it.

While most of the prior art effort had been directed to bleeding wheel cylinders or calipers, some has been directed to bleeding master cylinders, prior to their incorporation into the vehicle's brake system. See U.S. Pat. No. 4,236,549, which discloses a bleed valve having a housing at one end adapted to be threaded into a master cylinder, and the other end having a barbed fitting accommodating a flexible hose, which cooperates with a radial passage through the barbed end of the housing to function as a one-way valve. While the bleed valve disclosed may have operated satisfactorily in bleeding the master cylinder prior to hooking it up into the brake system, the prior art device again was relatively expensive to manufacture and was made to fit but one size threaded opening in the master cylinder and could not be used on a bleed screw. Thus, to fit the various size threaded openings found in master cylinders, more than one such prior art bleed valve was needed, and in fact in today's split brake systems where each master hydraulic cylinder has two separate circuits, to bleed both at once, a second set of such prior art bleed valves would be needed. Again, it is very unlikely the mechanic would have all the necessary parts to bleed a brake system, e.g. two master cylinder bleed valves for each of the various size master cylinder threaded openings and four or more wheel cylinder/caliper bleed valves. While a specialty brake shop might be able to justify such expense, general automobile repair shops, which do brake overhauls, or the home mechanic, most likely, would not.

BRIEF SUMMARY OF THE PRESENT INVENTION

The brake bleeder valve of the present invention has overcome the foregoing disadvantages and comprises a housing which is adapted to be attached or connected to a hydraulic system and a one-way valve therein, all of which can be made, and preferably is moulded, in a one piece body of a flexible or resilient material. Thus, the bleeder valve of the present invention is economical to make and dispenses with the various extraneous parts of brake bleeder valves of the prior art used to close the valve and/or connect it to the standard bleed screw fitting. The brake bleeder valve of the present invention preferably comprises a duckbill type valve which utilizes a pair of opposed moulded lips to perform the valving function, instead of the heretofore balls or valve bodies and springs. Preferably, the duckbill is mould as part of the bleeder valve housing. Additionally, being resilient, the bleeder valve of the present invention may have its housing adapted to fit more than one size of threaded opening used in hydraulic systems and/or one or more sizes of standard bleeder screws used on such systems so that any need for additional parts to connect the bleed valve is eliminated. Instead of being threaded at one end, like prior art bleeder valves, to fit but one size threaded opening, the housing of the bleeder valve of the present invention is resilient and shaped so it can be forced, sealingly into one or more sized threaded openings. To insure a good seal, the ends of the housing engaged in the opening can be provided with one or more beads or raised portions to engage and seal with the one or more sizes of threaded opening. The interior of the housing adjacent the duckbill can, alternatively or additionally, be provided with a cavity shaped to snap sealingly onto the standard sizes of bleed screws to connect the bleed valve and conventional bleed screw together. While it has been known to use a duckbill valve in hydraulic systems to control the flow of fluid, (for example, such type valves are used in master cylinders on drum brake systems to prevent the wheel cylinders from fully retracting the brake shoes away from the drums when the master cylinder is withdrawn) prior to now, duckbill valves have never been known to be used to bleed such brakes.

Additionally, as the bleeder valve of the present invention is very inexpensive to manufacture, it can be used as a shipping plug/thread protector while shipping or storing parts prior to installation, such as master cylinders, and can then be utilized to bleed the master cylinder before connecting it to the remainder of the brake or hydraulic system.

With the present invention, the wheel cylinders/calipers are bled in a manner as with prior art bleeder valves. The bleeder valves of the present invention are merely snapped in place on the bleed screws, which are then opened; the brake pedal is pumped until all air from all four wheel cylinders is expelled; the bleed screws are closed; and the bleed valves are pulled off the bleedscrews. The bleed valves of the present invention are so inexpensive, they could be either thrown away, or if made of a brake fluid resistant material, saved for the next job.

An object of the bleed valve of the present invention is to provide a one piece construction which is inexpensive to manufacture.

Another object of the bleed valve of the present invention is to provide a duckbill construction which can be inexpensively mould and dispenses with separate valve closing and biasing members.

Yet another object of the bleed valve of the present invention is to provide a construction which fits more than one size threaded opening.

Still another object of the bleed valve of the present invention is to provide a construction which can also be snapped in place on a standard bleed screw.

These and other objects of the bleed valve of the present invention will become apparent from the following written description and the accompanying FIGURES of the drawing.

BRIEF DESCRIPTION OF THE DRAWING

FIG. 1 is a perspective view of a first embodiment of bleed valve of the present invention.

FIG. 2 is an enlarged cross-sectional view of the valve shown in FIG. 1, shown attached to a standard bleed screw.

FIG. 3 is a perspective view of a second embodiment of bleed valve of the present invention.

FIG. 4 is an enlarged cross-sectional view of the valve shown in FIG. 3, shown installed in a threaded outlet opening of a master cylinder.

DESCRIPTION OF THE PREFERRED EMBODIMENTS

Referring to FIGS. 1 and 2, a first embodiment of bleed valve 10, particularly suited for bleeding air or gas from hydraulic fluid in a brake system, such as a wheel cylinder/caliper 12 shown in FIG. 2. The wheel cylinder/caliper 12 is conventional and has a piston therein (not shown) which is moved by hydraulic pressure from a source, such as a power or non-power operated master cylinder (See FIG. 4). The piston is supplied with fluid through a passageway which has a portion thereof 14 terminating at an outlet closed by a convention bleed screw 16. This outlet of the wheel cylinder/caliper and bleed screw 16 is generally located in an upper portion of the cylinder/caliper so that air or gas tends to collect there.

The bleed valve 10 of the present invention is shown connected to the bleed screw 16 and for this purpose has a housing or body made of a flexible or resilient material, such as rubber or plastic. Preferably, the rubber used would have a durameter reading of 60±3, so that it holds its shape, but is still flexible enough to install on a bleed screw or in a threaded opening. Should it be desired to reuse the bleed valve of the present invention, the material chosen should be resistant to deterioration caused by conventional brake fluids, such as SBR rubber. As is shown, the upstream end 18 of the bleed valve has a passage 20 all the way through the bleed valve, and the passage is opened up somewhat to form a cavity 22 to sealingly accommodate the head 24 of the bleed screw 16. It is understood that the cavity is the same size or smaller than the head 24 of the bleed screw so that the bleed valve 10 can be held to the bleed screw without leaking.

Downstream of the cavity 22, the passage through the body of the bleed valve 10 is closed by a one-way valve 26 formed, preferably, integral with the body of the bleed valve 10. Preferably, this one-way valve is formed by a pair of opposed lips 28 and 30 closed at their adjacent sides 32 to each other, and extending toward each other in the downstream direction. A one-way valve of this construction is also known as a "duckbill" valve because of the shape of the lips 28 and 30 approximate that of a duck's bill. The lips 28 and 30, when they are made or formed, are iternally biased toward each other to close the downstream end of the passsage 20. As will be described in conjunction with the second embodiment shown in FIGS. 3 and 4, the bleed valve 10 has a radially extending flange 34 and one or more beads or bumps, and in this instance the plurality thereof 36, 38 and 40, which extend around the perimeter of the upstream end.

Referring to FIGS. 3 and 4, a second embodiment of bleed valve 50 of the present invention is illustrated. Parts of the second embodiment which are similar to the first embodiment 10 are given the same reference numerals as in FIGS. 1 and 2.

As is shown in FIG. 4, the upstream end of bleed valve 50 is shown pushed into a threaded opening 52 formed in a master cylinder 54. The outer tip 56 of this upstream end is small enough to enter the opening, but the beaded portions 36, 38 and 40 adjacent the flange 34 are large enough to form a tight, non-leaking fit with the threaded opening. The flange 34 functions as a stop to limit the distance the bleed valve is inserted into the opening. The presence of the beads or raised portions or bumps 36, 38 and 40 enhance the sealing action, and also permit the upstream end to also seal with larger size threaded openings. Thus, either embodiment 10 or 50 can be secured to two or more different size threaded openings in a hydraulic system, such as the master cylinder shown, or to a bleed screw utilizing the cavity 22 which snap fits onto the bleed screw.

In constructing the present invention, the passage 20 and duckbill valve 26 are sized large enough so that little or no hydraulic pressure or force is developed or imposed on the bleed valve tending to force or dislodge it from the bleed screw or threaded opening during bleeding. Generally an opening at least about 80 percent of the passage size being bled is sufficient to prevent dislodgement.

As is shown in FIGS. 3 and 4, the downstream end 52 is curved, in this instance, over an arc of about 90°. Of course, other arcs or angles, such as 30° or 40°, could be used. The function of the bend or curve is to direct the exiting brake fluid away from any painted surfaces, as some brake fluids attack paint. The outer or downstream end of the body 50 has a plurality of barbs 54 to accommodate a tube or hose to direct the exiting fluid into a container, or in the case of a master cylinder, if desired, back into its reservoir.

The bleed valves 10 and 50 are used as follows. First, the master cylinder, which can be shipped with a bleed valve 20 or 50 in place in its threaded opening as a shipping plug and/or thread protector is bled simply by pumping the master cylinder. After this bleeding operation, the bleed valve 20 or 50 is then simply plucked or pulled from the threaded opening, and in the case of bleed valve 10, the extending duckbill is used as a pull tab to remove it. After the master cylinder is bled, it can be connected to the brake system, the vehicle's brake system being connected to the same threaded opening that held the bleed valve. Now the vehicle's four wheel cylinders or calipers can be bled at once or in pairs, as desired. The four wheel operation will be described. Four bleed valves, 10 or 50, are placed, one on each of the wheel cylinder or caliper bleed screw 16, and the latter opened. The master cylinder is then pumped by the mechanic several times until all air is expelled and the brakes have a "solid" feel. The mechanic can then close all four bleed screws 16 and remove the bleed valves 10 or 50. Thus, the bleeding of the master cylinder and all wheel cylinders/calipers is quickly accomplished by a single person. The removed bleed valves 10 or 50 can be discarded, or if made of a suitable material, saved and reused.

While the bleed valve of the present invention has been described with respect to an automotive brake system, it could also be asked to bleed aircraft, other brake or hydraulic systems such as a hydraulic clutch control. While bleed valve 10 was shown used on a wheel cylinder/caliper, it can also be used on a master cylinder. Likewise, the bleed valve 50 could be used on a wheel cylinder/caliper bleed screw.

While only the preferred embodiments of bleed valves of the present invention have been illustrated and described, from the foregoing, it should be understood that variations, modifications and equivalent structures fall within the scope of the appended claims.

What is claimed is:

1. A removable valve for bleeding gas from a hydraulic system having an opening, said removable valve comprising a one-piece body made of a resilient material having a passage therethrough with an upstream end and a downstream end, said upstream end of said passage being adapted to connect to the opening of the hydraulic system, and a one-way valve being formed in said passage in said one-piece body to permit substantially only flow from said upstream end to said downstream end, whereby the upstream end of said one-piece body of said removable valve can be connected to said hydraulic system and any gas therein bleed from the hydraulic system and the removable valve then removed.

2. A removable valve as in claim 1, wherein said one-piece body is molded to shape.

3. A removable valve as in claim 1, wherein said one-way valve is a duckbill valve formed integral with said one-piece body.

4. A removable valve as in claim 1, wherein the opening of the hydraulic system is provided by a conventional bleed screw, and said upstream end of said one-piece body has a cavity formed therein adapted to receive the conventional bleed screw to connect said removable valve to the bleed screw of the hydraulic system.

5. A removable valve as in claim 1, wherein said upstream end is adapted to connect to two or more size openings for hydraulic systems.

6. A removable valve as in claim 5, wherein said upstream end has a cavity therein adapted to receive a hydraulic system bleed screw, and wherein the outer margins of said one-piece body at said upstream end has a raised portion on its perimeter to sealingly engage with one or more size openings, whereby the removable valve can be connected to either one or more size openings or the bleed screw of the hydraulic system.

7. A removable valve as in claim 1, wherein said one-piece body is nonlinear and its upstream and downstream ends are at an angle to each other.

8. A removable valve as in claim 2, wherein said one-way valve is a duckbill valve formed integral with the one-piece body, said upstream end having a cavity formed therein adapted to receive a conventional bleed screw to connect said removable valve to a hydraulic system bleed screw, and said body being substantially curved along an arc at an angle of 30 degrees or more.

9. A removable valve as in claim 2, wherein said one-way valve is a duckbill valve formed integral with the one-piece body, said upstream end being adapted to engage in two or more size threaded openings for hydraulic systems, the outer margin of said one-piece body at said upstream end having at least one raised bead on is perimeter to sealingly engage with the two or more size threaded openings.

10. A removable valve as in claim 1, wherein said passage therethrough and said one-way valve are of sufficient flow area size to prevent the hydraulic pressure or force occurring during bleeding to dislodge said removable valve from the opening of the hydraulic system.

11. A removable valve for use in bleeding air from a hydraulic brake component having an outlet, comprising a body having an upstream end and downstream end with a connecting passage therebetween, said upstream end being adapted to connect to the outlet of the hydraulic brake system, a duckbill valve in said passage permitting substantially only flow in said passage from said upstream end out said downstream end, said duckbill valve being formed of a resilient material, whereby the removable valve may be connected to the hydraulic brake component and the latter bleed and the removable valve then removed.

12. A removable valve as in claim 11, wherein said hydraulic brake component has at least one bleed screw and said upstream end of said removable valve is adapted to connect to said bleed screw.

13. A removable valve as in claim 11, wherein said hydraulic brake component is a master cylinder with a hydraulic pressure outlet opening therein, said upstream end being adapted to engage with the outlet opening in the master cylinder, whereby the removable valve may be connected to the master cylinder and the latter may be bled.

14. A removable valve as in claim 13, wherein said removable valve may be installed in said opening of the master cylinder to protect the opening prior to installation and then subsequently removed.

15. A removable valve as in claim 14, wherein said duckbill valve is adapted to extend out the master cylinder opening, whereby said removable valve may be removed after bleeding the master cylinder by pulling on the extending duckbill valve.

16. A removable valve as in claim 11, wherein said upstream end has a cavity on the inside of said body to receive a conventional bleed screw, and said upstream end outer perimeter being adapted to be sealingly engaged in a threaded opening of the hydraulic component, whereby said removable valve may be connected to either a bleed screw or a threaded opening.

* * * * *